Figure 1:
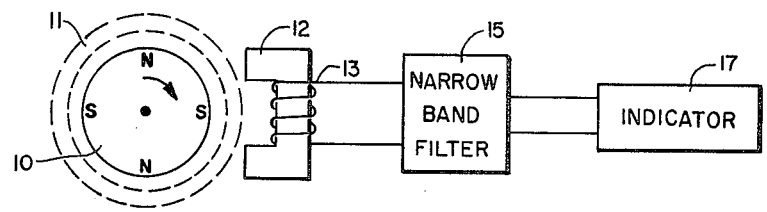

June 8, 1965      A. M. MacCALLUM      3,188,620

REMOTE MOTOR ROTATION INDICATOR

Filed Jan. 30, 1961      2 Sheets-Sheet 1

INVENTOR.
ALAN M. MAC CALLUM
BY
*Earl C. Hancock*
AGENT

INVENTOR.
ALAN M. MAC CALLUM
BY Earl C. Hancock
AGENT

3,188,620
REMOTE MOTOR ROTATION INDICATOR
Alan M. MacCallum, Denver, Colo., assignor to Martin-Marietta Corporation, a corporation of Maryland
Filed Jan. 30, 1961, Ser. No. 85,859
5 Claims. (Cl. 340—263)

This invention relates generally to remote motor rotation indicators and more particularly to apparatus for providing an indication at a location remote from an enclosed electric motor that the motor is operating at a specified rotational speed without comprising the operation of the motor.

Often it is necessary to determine whether or not an enclosed electric motor is operating at a predetermined specified speed and to have this information available at a location separated from the motor by some distance. This problem is frequently encountered in systems where hysteresis or synchronous motors such as gyros are being employed. Many arrangements for resolving this problem have been suggested but each such arrangement has its own limitations associated therewith. For instance, one arrangement suggested for indicating that a gyro has reached synchronous speed comprises two warning lights, one actuated immediately upon the application of power to the gyro and the other actuated by a time-delay relay set to close after the passage of what should be sufficient time for the gyro to reach synchronous speed. This arrangement has the limitation that it never provides a positive indication that the gyro rotor is in fact turning at synchronous speed. Several systems for providing a more positive indication have been developed and one such system is shown in U.S. Patent 2,534,463 issued to Alan M. MacCallum on December 19, 1950.

In accordance with the present invention, a system is provided whereby an operator or equipment at a location remote from an enclosed electric motor will have available a positive indication of whether or not the motor is turning at a specified speed. This system requires only minor modification of the motor and in some instances can be employed with no modification of the motor whatsoever and in any event, will not compromise the motor operation to any substantial extent.

In a hysteresis motor, with 4 or more poles, the flux fields produced by each of the permanent magnet poles on the rotor thereof are never exactly equal in strength and consequently the magnetic paths developed in the rotor will exhibit a slightly different magnetic permeability. It has been found that this variation in magnetic field strengths will cause a magnetic flux field to appear externally to the motor casing and, relative to a given point on the casing, will appear to vary at a subharmonic of the motor excitation frequency. In accordance with one embodiment of the present invention, the aforementioned magnetic path variation is advantageously harnessed to provide a positive remote indication that the motor has attained a specified speed by detecting the magnetic flux variations present externally to the rotor, coupling the detected signals to a narrow-band filter designed with a center-frequency substantially equal to the subharmonic, and then connecting an indicating device to the filter so as to provide a positive indication whenever a subharmonic signal is passed by the filter. By this embodiment, the motor operation is not compromised either mechanically or electrically.

In some cases it may be convenient to have magnetic field variations that are detectable at some distance from the motor casing or with greater strength than that provided by the magnetic path unbalance through the rotor poles as mentioned hereinbefore. To effect this, another embodiment of the present invention provides a system wherein permanent magnets are emplaced on the rotor so that when the rotor is revolving, a rotating field is generated that is discernible at some distance. The number of permanent magnets so emplaced on the rotor is chosen so that the frequency generated thereby when the motor is turning at the specified speed is not equal to the motor excitation frequency. A suitable inductive pick-up device can then be placed in proximity to these permanent magnets either within or without the motor housing. A frequency selective device designed to pass signals at the permanent magnet generated frequency can then be coupled to receive the output of the pick-up device and to actuate an indicator. This embodiment is particularly useful for gyros where it is necessary to provide a remote indication that the gyro has reached sychronous speed with a minimum of restraint upon the mechanical or electrical operation thereof.

Figure 2:
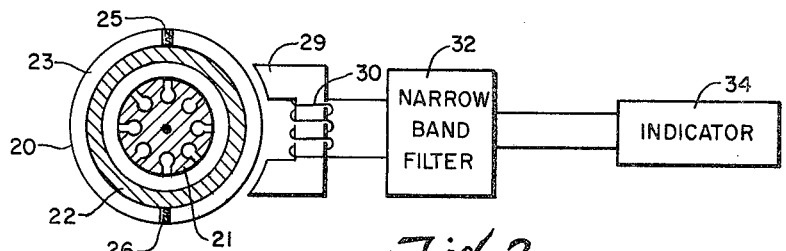
Figure 3:
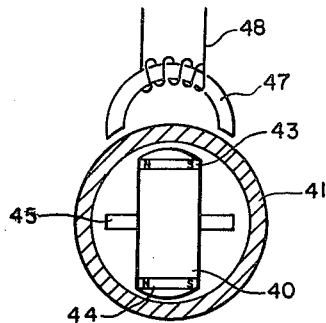
Figure 4:
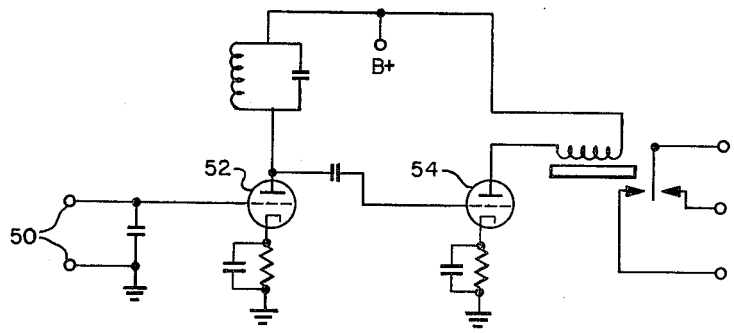
Figure 5:
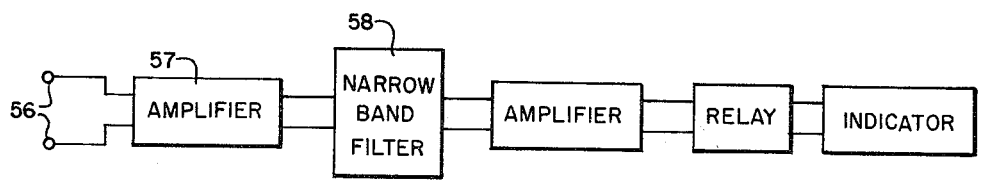

The novel features that are considered characteristic of this invention are set forth with particularity in the appended claims. The invention itself, however, both as to its organization and method of operation as well as additional features and advantages thereof will be best understood from the following description when read in connection with the accompanying drawings in which:

FIGURE 1 is a simplified illustration of an indicating system for a hysteresis motor in accordance with one embodiment of this invention; and FIGURE 2 shows another embodiment of this invention utilizing a permanent magnet embedded in the rotor of a hysteresis motor; and FIGURE 3 illustrates another arrangement of the bar magnets and pickup head; and FIGURE 4 illustrates a typical frequency selective circuit that could be used with the present invention; and FIGURE 5 shows a block diagram of another system that could be employed in the present invention.

FIGURE 1 reveals one embodiment of the present invention which advantageously utilizes the slight magnetic path unbalance in the rotor of a hysteresis motor, the structure of the hysteresis motor being simplified for purposes of illustration. The hysteresis motor is shown as having four poles on rotor 10 although it is to be understood that the invention is in no way limited to this particular number of poles. The stator and housing for the motor are shown in dashed lines at 11, and the rotor 10 in operation will appear to have two south pole ends and two north pole ends around the periphery thereof as indicated. Each of these pole ends may be considered as representing one end of a permanent bar magnet and since perfection is impossible, the two individual magnets developed in rotor 10 will never have exactly the same field strength. Thus when rotor 10 is spinning, the difference in the strengths of the two magnetic fields will generate an A.C. voltage which may be detectable externally to casing 11 and which will appear at a frequency that is a direct function of the number of poles on rotor 10 and the speed of rotation thereof. Thus when the motor is running at synchronous speed, a signal will be generated at a subharmonic of the excitation frequency. By way of example, it has been found through experiments that the aforementioned magnetic path unbalance in a four pole hysteresis motor having a 400 cycle excitation voltage introduced thereto will produce a 200 cycle signal when the motor is running at a synchronous speed of 12,000 r.p.m. It should be noted that this system could not be used for a two pole hysteresis motor, however, since the unbalance frequency at synchronous speed and the excitation frequency would then be substantially identical.

An inductive pickup means placed with sufficient proximity to the rotor 10 can be actuated by the varying magnetic fields emanating from the motor. One such pickup means is shown in FIGURE 1 wherein U-shaped magnetic core 12 located externally to motor casing 11 will concentrate the magnetic flux lines emanating from housing 11 and variations in the magnitude of the magnetic field so concentrated will induce voltages in coil 13. Narrow band filter 15 has a design center-frequency substantially equal to the subharmonic generated by the spinning of the unbalanced magnetic fields in rotor 10 so that filter 15 will block all other signals except the subharmonic. Thus it is only necessary to design indicator 17 so as to be actuated by any output signals from filter 15. It is to be understood that there are a variety of means and apparatus available to provide the operation of core 12 and coil 13, filter 15 and indicator 17. For instance, core 12 in some arrangements could be left out entirely and coil 13 wrapped directly around casing 11. As long as they do not interfere with the motor operation, core 12 and/or coil 13 could be placed inside housing 11 of course. Also, narrow band filter 15 could be an M-derived filter or a tuned amplifier or the like, and indicator 17 could include a relay-controlled warning light. In addition, indicator 17 might advantageously utilize a vibrating reed arrangement if this should be desirable to differentiate between the subharmonic signals and signals of frequencies displaced only slightly therefrom. The foregoing and many other variations in accordance with this invention will be readily apparent to those having normal skill in the art.

In case the magnitude of the rotor magnetic path unbalance is not expected to be of a desirable magnitude, the motor itself can often be designed so that the unbalance is accentuated slightly and still not comprise the electrical or mechanical operation of the motor. For instance, experimentation has shown that the unique motor signal frequency may be emphasized by several means. If a 90 degree section of the hysteresis ring in a hysteresis motor is heated to 640° F. or to a light blue color and then quenched, the unbalance in the permanent poles will be accentuated thereby increasing the magnitude of the voltage induced in the pickup coil as compared to the uniformly heat treated hysteresis ring. Another means that proved successful in increasing the unbalance was to use slightly unsymmetrical windings on the stator. In a motor that developed four poles in the hysteresis ring, this was done by removing 10 turns from one set of stator poles and adding 10 turns to the winding of the other set.

Another means of increasing the magnitude of the discernible magnetic fields is illustrated in the embodiment of this invention as shown in FIGURE 2. In FIGURE 2, a hysteresis motor is shown having a stator 21 and a rotor 20 with rotor 20 comprising a hysteresis ring 22 and a rim 23. Attached to or imbedded in rim 23 are two permanent bar magnets 25 and 26. An inductive pickup head comprising a U-shaped laminated core 29 and a coil 30 is placed sufficiently close to the motor so as to be actuated by magnetic fields emanating therefrom. When rotor 20 is revolving, bar magnets 25 and 26 will cause A.C. signals to be induced in coil 30 at a frequency that is a direct function of the speed of rotation of motor 20. For practical purposes it is desirable to select the number of magnets attached to rotor 20 so that the frequency generated thereby and sensed at coil 30 will be other than the excitation frequency when the motor is rotating at synchronous speed. Narrow mand filter means 32 will then produce an output signal indicating that rotor 20 has attained synchronous speed is filter 32 is designed to pass the frequencies substantially equal to the bar magnet generated frequency. The output signal of filter 32 then actuates indicator means 34. In an experiment involving a gyro, two bar magnets were attached to the rotor in a manner similar to that shown in FIGURE 3 and aligned parallel with the spin axis. When the gyro had reached the synchronous speed 24,000 r.p.m., a signal at 800 cycles was produced which was clearly discernible from the 400 cycle excitation voltage. The pickup 29 was actually physically displaced from the casing of the motor and thus caused no disturbance of the mechanical or electrical motor operation.

Several experiments were performed in an effort to determine the optimum practical orientation of the bar magnets and the pickup head, and it was found that an arrangement such as that shown in FIGURE 3 was quite satisfactory. In FIGURE 3, rotor 40 is enclosed by casing 41 and has holes drilled therethrough for the mounting of alnico magnets 43 and 44 which were .579 inch long and .0894 inch in diameter, the foregoing dimensions being kept small so as not to weaken the rotor. Distortion was minimized when the poles of magnets 43 and 44 were oriented with respect to each other and shaft 45 as shown in FIGURE 3. Then with a Monel shell for casing 41, a C-shaped laminated core 47 using Allegheny Ludlum steel was oriented externally to casing 41 but centered over rotor 40 in the radial direction and as nearly parallel as possible with the axis of shaft 45 and centered thereover in the vertical direction. Coil 48 was made up of 4000 turns of #40 insulated wire. Then by placing a .070 microfarad capacitor in series with coil 48 and operating into a 1000 ohm load, it was found that the 400 cycle excitation signal induced a signal of only 1.5 mv. at the load while the 800 cycle signal induced by the rotation of magnets 43 and 44 at synchronous speed produced a signal of 36.0 mv. at the load. Thus it can be seen that the pickup head could be designed to perform both the detecting and the filtering functions. The pickup head could be located inside the motor casing of course or it could be made a part of the casing if this should be desirable. For practical purposes, it is also advisable to choose the number of bar magnets used so as to provide dynamic mechanical balance although this may not always be necessary.

Many variations on the filtering and indicating means for this invention will be readily apparent to those skilled in the art and two such systems are suggested in FIGURES 4 and 5. In FIGURE 4, for example, the pickup output would be introduced to terminals 50, amplified by narrow-band amplifier 52 and then employed to activate relay-control circuit 54 when the motor has reached the desired speed. If the detected signals are weak, then the circuit of FIGURE 5 might be employed wherein the pickup output is coupled to terminals 55, amplified in amplifier 56, passed through narrow-band filter 58, and then amplified and utilized to produce an indication.

Although this invention has been shown and described herein with particularity, it is to be understood that the invention is not limited to the exact form or use indicated and that variations may be made in the particular designs and configurations without departing from the scope and spirit of this invention.

What is claimed is:

1. An apparatus for providing a remote indication that the rotor of an enclosed hysteresis motor is turning at a specified speed comprising a plurality of poles on said rotor, said rotor being designed, constructed and arranged so that at least two of said poles of said plurality will have unequal magnetic strengths, inductive pickup means located with sufficient proximity to said rotor to detect magnetic fields emanating from said poles, the said unequal magnetic strengths causing a signal to appear at said inductive pick-ip means at a subharmonic of the excitation voltage frequency for said motor when said rotor is turning at the said specified speed, narrow band filter means connected for receiving the output of said inductive pick-up means and being designed to produce an output signal therefrom only when signals substantially equal to said subharmonic are introduced thereto, and indicator means coupled to said narrow band filter means so as to be activated by output signals therefrom.

2. An apparatus for providing a remote indication that the rotor of an enclosed synchronous motor has attained synchronous speed and which said synchronous motor has excitation voltages of a first frequency applied thereto comprising a plurality of permanent magnets mounted in said rotor so that when synchronous speed is attained by said rotor the magnetic field emanating from said plurality of permanent magnets will vary in strength at a second frequency with respect to the casing of said motor, said second frequency being detectably displaced in the frequency spectrum from the said first frequency, pick-up means located exteriorly of said casing but within sufficient proximity to said rotor for detecting time-varying magnetic field emanating therefrom, narrow-band filter means connected to receive output signals from said pick-up means, said narrow-band filter means being designed to produce an output when signals substantially equal to said second frequency are introduced thereto while attenuating signals of other frequencies, and indicator means coupled to said narrow-band filter means for providing a visual indication whenever an output signal appears from said narrow-band filter means.

3. An apparatus in accordance with claim 2 wherein the said plurality of permanent magnets is placed in said rotor so as to provide dynamic mechanical balance therefor, each of the permanent magnets of said plurality being mounted parallel to the axis of rotation of said rotor.

4. An apparatus in accordance with claim 3 wherein said narrow-band filter means includes a tuned amplifier stage.

5. An apparatus in accordance with claim 3 wherein said pick-up means comprises a U-shaped laminated structure capable of supporting magnetic flux therein, and a plurality of turns of wire coiled around said U-shaped laminated structure, the open end of said U-shaped laminated structure being placed towards the casing of said motor.

References Cited by the Examiner

UNITED STATES PATENTS

| | | | |
|---|---|---|---|
| 1,647,270 | 11/27 | Burton | 340—263 |
| 2,679,629 | 5/54 | Hellar. | |
| 2,734,161 | 2/56 | Fryklund | 318—328 |
| 2,805,677 | 10/57 | Baird | 340—263 |
| 2,913,662 | 11/59 | Hogan | 324—70 |
| 2,941,120 | 6/60 | Harmon. | |
| 2,948,852 | 8/60 | Bacon | 324—70 |

FOREIGN PATENTS 218,119  10/58  Australia.

NEIL C. READ, *Primary Examiner.*

BENNETT G. MILLER, *Examiner.*